(12) United States Patent
Wezyk et al.

(10) Patent No.: US 7,500,710 B2
(45) Date of Patent: Mar. 10, 2009

(54) HARDTOP VEHICLE ROOF WITH EXTERNAL ROOF KINEMATIC SYSTEM

(75) Inventors: Wojciech Wezyk, Sindelfingen (DE); Berthold Klein, Rutesheim (DE); Thomas Halbweiss, Remseck (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 268 days.

(21) Appl. No.: 11/553,286

(22) Filed: Oct. 26, 2006

(65) Prior Publication Data
US 2007/0090665 A1    Apr. 26, 2007

(30) Foreign Application Priority Data
Oct. 26, 2005    (DE)    ....................... 10 2005 051 647

(51) Int. Cl.
*B60J 7/08*    (2006.01)
(52) U.S. Cl. ................................. 296/107.17
(58) Field of Classification Search ............ 296/107.01, 296/107.16, 107.17
See application file for complete search history.

(56) References Cited

U.S. PATENT DOCUMENTS

| | | | |
|---|---|---|---|
| 3,271,067 A * | 9/1966 | Rollman | .................... 296/116 |
| 5,078,447 A | 1/1992 | Klein et al. | |
| 6,767,045 B2 | 7/2004 | Reinsch | |
| 6,796,597 B2 | 9/2004 | Mac Farland | |
| 7,134,708 B2 * | 11/2006 | Russke | ........................ 296/108 |
| 2002/0135200 A1 * | 9/2002 | De Gaillard | ........... 296/107.01 |
| 2003/0085587 A1 | 5/2003 | Reinsch | |
| 2004/0145212 A1 | 7/2004 | Mac Farland | |
| 2005/0104412 A1 * | 5/2005 | Perakis | .................. 296/107.18 |
| 2005/0156449 A1 | 7/2005 | Bruder et al. | |

FOREIGN PATENT DOCUMENTS

| | | |
|---|---|---|
| DE | 198 31 133 A1 | 1/2000 |
| DE | 199 26 474 A1 | 12/2000 |
| EP | 1 308 333 A1 | 5/2003 |
| EP | 1 331 122 A1 | 7/2003 |

* cited by examiner

*Primary Examiner*—H Gutman
(74) *Attorney, Agent, or Firm*—Brooks Kushman P.C.

(57) ABSTRACT

A hardtop vehicle roof having at least two rigid roof parts, at least one of which can be adjusted, by a roof part kinematic system, between a closed position in which the vehicle interior is covered and in which the roof parts are arranged one behind the other in the direction of travel, and a storage position exposing the vehicle interior. The roof part kinematic system of the roof parts is arranged on the outside of at least one roof part facing away from the vehicle interior.

20 Claims, 9 Drawing Sheets

HARDTOP VEHICLE ROOF WITH EXTERNAL ROOF KINEMATIC SYSTEM

CROSS-REFERENCE TO RELATED APPLICATIONS

This application claims foreign priority benefits under 35 U.S.C. § 119(a)-(d) to DE 10 2005 051 647.5, filed Oct. 26, 2005, which is hereby incorporated by reference in its entirety.

BACKGROUND OF THE INVENTION

1. Field of the Invention

The present invention relates to a hardtop vehicle roof having a plurality of roof parts in which the roof parts are movable between closed and stored positions of the roof.

2. Background Art

EP 1 463 647 B1 (corresponding to U.S. Patent Application Publication No. 2005/0156449) describes a hardtop vehicle roof having three rigid roof parts. Kinematic systems pivot the front and rear roof parts relative to the middle roof part. An adjustment kinematic system pivots the middle roof part relative to the vehicle body. In the storage position of the roof, the roof parts are laid in the same direction in a stack within a storage compartment of the vehicle. Because the roof parts are stacked with the front and rear roof parts stored above the middle roof part, the middle roof part maintains its position while the roof parts are being stacked. As such, the roof part stacking does not encroach the vehicle interior. However, the kinematic systems consume a relatively large amount of space within the vehicle interior. As such, passenger headroom is relatively limited when the roof is in the closed position covering the vehicle interior.

DE 41 00 677 C2 (corresponding to U.S. Pat. No. 5,078,447) describes a vehicle roof having two roof parts. The front roof part is adjustable between closed and opened positions. To accomplish such adjustment, four-bar kinematic systems mount the front roof part on side supports. The side supports are movable in retaining channels in the rear roof part. The retaining channels are open on their top side. When the roof is in the closed position covering the vehicle interior, the side supports, which are part of the kinematic systems, are located in the vehicle interior and thus encroach upon passenger headroom.

SUMMARY OF THE INVENTION

An object of the present invention is a hardtop vehicle roof having multiple roof parts movable by a kinematic system between a closed position of the roof in which the roof parts cover the vehicle interior and a stored position of the roof in which the roof parts are stacked upon one another and stored within a storage compartment of the vehicle thereby exposing the vehicle interior in which the kinematic system does not encroach upon the vehicle interior when the roof is in the closed position.

In carrying out the above object and other objects, the present invention provides a hardtop vehicle roof The roof includes at least two roof parts movable between a closed position in which the roof parts are arranged flush behind one another in a longitudinal direction to thereby cover a vehicle interior and a storage position in which the roof parts are arranged in a stack to thereby expose the vehicle interior. Each roof part has an exterior surface facing away from the vehicle interior in the closed position. Each roof part has first and second longitudinally extending sides transversely separated from one another. The roof further includes a first pair of roof part kinematic mechanisms transversely separated from one another. One of the roof part kinematic mechanisms articulately connects the first sides of two of the roof parts together and the other of the roof part kinematic mechanisms articulately connects the second sides of the two roof parts together to move the two roof parts between the closed and storage positions. In the closed position, the two roof parts are arranged flush behind one another in the longitudinal direction with a first one of the two roof parts arranged in front of a second one of the two roof parts. The roof part kinematic mechanisms are respectively arranged on the exterior surface of the second roof part on the sides of the second roof part. In the closed position, the roof part kinematic mechanisms respectively form at least a part of a pair of roof rail systems running longitudinally along the exterior surfaces of the roof parts.

In accordance with an embodiment of the present invention, a roof kinematic system is configured to move a hardtop vehicle roof having multiple roof parts between a closed position in which the roof parts cover the vehicle interior and a stored position in which the roof parts are stacked upon one another and moved away from the roof level of the vehicle to expose the vehicle interior. The roof kinematic system generally includes a roof part kinematic system for each pair of roof parts. Each roof part kinematic system articulately connects a pair of roof parts together and is operable to move the roof parts relative to one another and to the vehicle interior to move the roof between its closed and stored positions. Each roof part kinematic system includes a roof part kinematic mechanism on each of the two longitudinal sides of the roof. The entire roof kinematic system (i.e., all of the roof part kinematic systems and mechanisms) is located outside of the vehicle interior. The roof part kinematic systems movably guide the respective roof parts from the outside of the vehicle interior. As such, the kinematic elements of the entire kinematic system do not have contact with the passenger area of the vehicle interior thereby resulting in more headroom for passengers. The configuration of the roof kinematic system increases passenger safety because in the event of an accident the kinematic elements do not deform inside the vehicle interior thereby making it possible to avoid passenger injuries due to kinematic elements deforming. When the roof parts are in the closed position of the roof, the roof part kinematic systems are supported on the outside of the roof or at least to rest partly on the outside of the roof.

In an embodiment of the present invention, when the roof parts are in the closed position, the roof kinematic system forms a rail system running in the longitudinal direction of the vehicle. The roof kinematic system forms at least part of or the entire rail system. In general, the roof kinematic system has a connection function as each roof part kinematic mechanism connects with a roof rail component of a roof part and connects this roof rail component with another roof part or with a roof rail component held on the other roof part. Preferably, the roof part kinematic mechanisms are connected with the roof rail components articulately. The rail system includes a pair of roof rails which run parallel to one another in the longitudinal direction and are transversely separated from one another. Roof racks for bicycles, ski boxes, and the like may be fastened across the roof rails. The design of the roof kinematic system as the rail system in accordance with the present invention has an advantage that in the closed position the presence of the roof kinematic system is inconspicuous as the roof kinematic system merges into the form of the rail system. Thus, depending on the embodiment, the roof kinematic system simultaneously has the functions of adjusting the roof parts between the closed and storage positions and carries the roof racks. As such, it is possible to provide a rail system for targa and convertible vehicles, while simultaneously enlarging the vehicle interior, in accordance with the present invention.

The rail system includes a pair of roof rail systems. Each roof rail system includes a longitudinal support (i.e., a roof rail) running in the longitudinal direction of the vehicle for mounting roof racks. Each longitudinal support is formed of at least two longitudinal support sections. The longitudinal support sections of each longitudinal support are aligned in the longitudinal direction of the vehicle. Each longitudinal support section is solidly connected with a respective roof part apiece. The longitudinal support or the longitudinal support sections may be connected with the roof parts through separated support feet. The support feet hold longitudinal support sections at a distance from the roof parts. The intermediate space between the top of the roof parts and the longitudinal supports or the longitudinal support sections facilitates the mounting of any roof racks.

In an embodiment of the present invention, each roof part kinematic system includes a link arrangement such as a four-bar kinematic system. The links of the link arrangement pivot on the outside of the roof parts, preferably on the outside of two adjacent roof parts. It is within the scope of the present invention for the roof parts to pivot not directly on the roof parts, but rather on components connected with the roof parts such as brackets.

In an embodiment of the present invention, at least one link of each roof part kinematic system is articulately connected with a support foot of one of the roof rail systems. This makes it possible to do without a separate fastening bracket. Each support foot holds a longitudinal support section and serves as a pivot point for a link of a roof part kinematic system.

In an embodiment of the present invention, each link of the roof part kinematic systems pivot on respective longitudinal support sections. This makes various possible designs conceivable. An advantageous embodiment involves having a link articulately connect a support foot of a first longitudinal support section with a second longitudinal support section. It is also conceivable for each link to pivot directly on two, preferably adjacent longitudinal support sections, or between two support feet.

In an embodiment of the present invention, each link of the roof part kinematic systems pivot on a pivoting extension. Each pivoting extension is preferably shaped like a flat bar and projects over one roof part in the direction of the other roof part. A further development of the present invention provides that each pivoting extension is formed by a part of a longitudinal support section. This section projects over the associated one roof part in the direction of the other roof part. That is, in the closed position, this section is located above the outside surface of the other roof part. The pivoting of the links on a pivoting extension makes it possible to arrange the links exclusively above a roof part. The roof parts are connected in the longitudinal direction through the pivoting extensions. A visually appealing way of arranging the pivoting extensions is for them to be aligned with adjacent longitudinal support sections in the closed position.

In an embodiment of the present invention, a section of each link of the roof part kinematic systems is arranged parallel to a longitudinal support when the roof is in the closed position. This makes it possible for the links to be concealed by the longitudinal support sections in the closed position. Preferably, the links pivot on the inside of the longitudinal support sections and/or support feet facing the middle of the vehicle so that they are concealed when viewed from the side of the vehicle. If the first end of a link is articulately connected with a support foot and its other end is articulately connected with a pivoting extension or a longitudinal support section, it is advantageous for the link to be essentially L-shaped. In the closed position, the longer leg of an L-shaped link is arranged parallel to a longitudinal support, and the shorter leg is arranged parallel to the support foot. The links may also be U-shaped, in order, for example, to connect two support feet or two downward pointing projections of the longitudinal support sections with one another.

It is expedient for each longitudinal support section to be formed, at least in sections, by a link of a roof part kinematic system. In this area it is possible to do without a separate, pure longitudinal support section.

In an embodiment of the present invention, the roof kinematic system couples the roof parts with one another in such a way that in the storage position the roof parts form a stack of roof parts lying one above the another.

In an embodiment of the present invention, the roof is in the form a three-part roof having front, middle, and rear roof parts. A front roof part kinematic system is between the front and middle roof parts and a rear roof part kinematic system is between the middle and rear roof parts. Each roof part kinematic system is a component of a roof rail system and in the closed position of the roof forms the roof rail systems. The roof part kinematic systems can move the roof into a stack of roof parts. The stacked roof parts can then be stowed in a storage compartment of the vehicle. The links of the roof part kinematic systems are articulately connected with the support feet of a longitudinal support section, and with a pivoting extension of another longitudinal support section.

In an embodiment of the present invention, a sunroof is part of at least one roof part. The sunroof is movable in the longitudinal direction, and is located between two opposite roof rail systems. In the closed position of the roof, the sunroof can be moved. Instead of or in addition to a sunroof, a pop-top roof is part of at least one roof part. A wind deflector running in the transverse direction of the vehicle is part of the front roof part for the roof opening exposed by the sunroof. The wind deflector is hinged to the front roof part.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
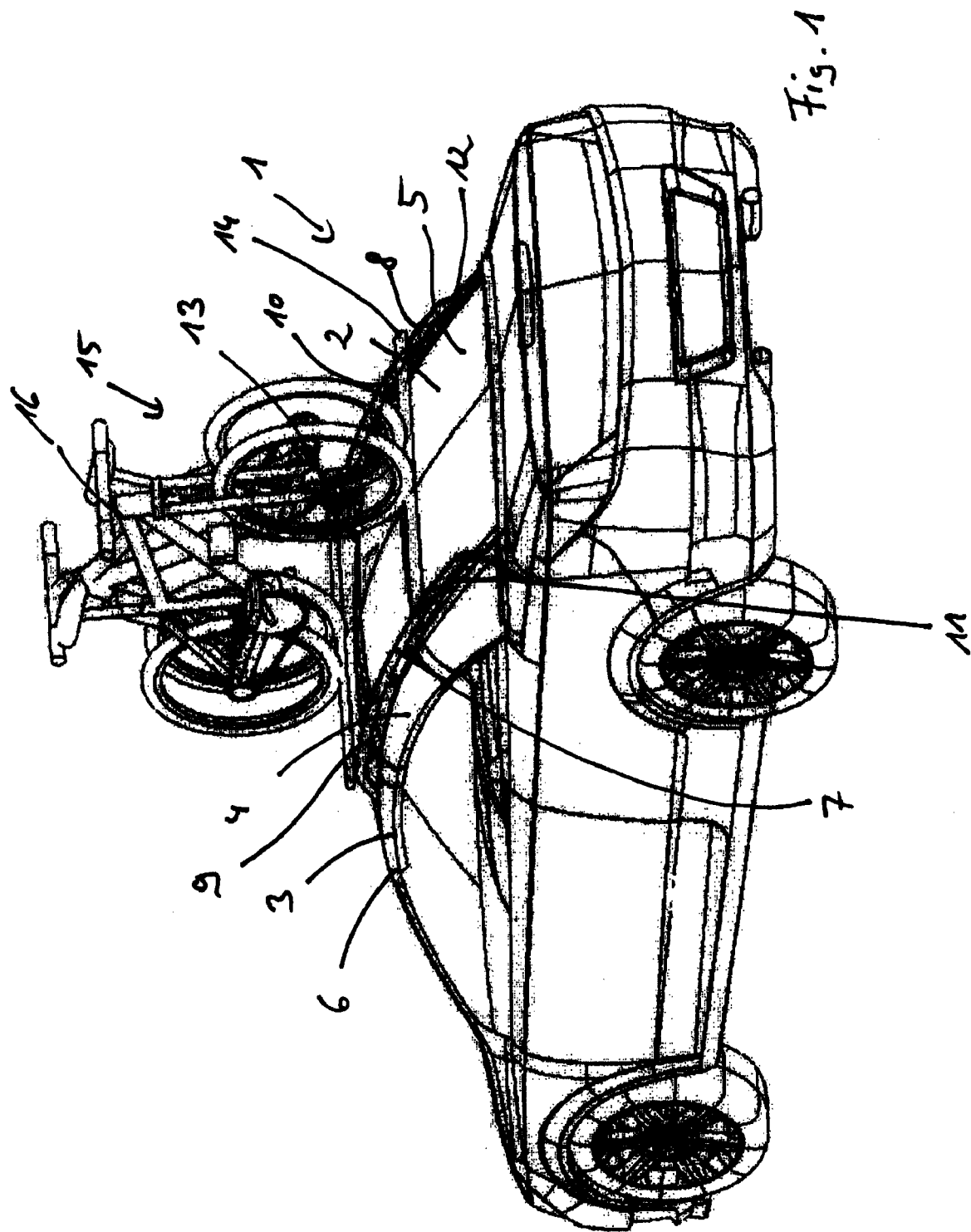
FIG. 1 illustrates a hardtop vehicle roof having front, middle, and rear roof parts in accordance with a first embodiment of the present invention with the roof being in the closed position covering the vehicle interior.

In the figures, elements that are the same and elements having the same function are labeled with the same reference numbers.

Referring now to FIGS. 1 through 6, a hardtop roof 2 for a vehicle 1 in accordance with an embodiment of the present invention is shown. Roof 2 is a three-part roof having rigid roof parts. The roof parts include a front roof part 3, a middle roof part 4, and a rear roof part 5. Front and middle roof parts 3, 4 are articulately connected to one another. Likewise, middle and rear roof parts 4, 5 are articulately connected to one another.

In general, roof 2 is movable between a closed position and a stored position. In the closed position (shown in FIG. 1), roof parts 3, 4, 5 extend over and cover the vehicle interior and are arranged flush behind one another with front roof part 3 in front of middle roof part 4 and middle roof part 4 in front of rear roof part 5 along the longitudinal direction of the vehicle. In the stored position (shown in FIG. 6), roof parts 3, 4, 5 are arranged in a stack and the roof part stack is moved to a storage compartment 29 of vehicle 1 to thereby expose the vehicle interior. As such, roof parts 3, 4, 5 are adjustable between closed and stored positions.

FIG. 1 illustrates roof 2 in the closed position. In the closed position, front roof part 3 is locked to a windshield frame 6 of vehicle 1. FIG. 6 illustrates roof 2 in the stored position. In the stored position, roof parts 3, 4, 5 are stacked upon one another and the stack is moved into a storage compartment 29 of vehicle 1. Roof parts 3, 4, 5 are adjustable between the closed position shown in FIG. 1 and the storage position shown in FIG. 6, through intermediate positions shown in FIGS. 2 through 5.

First and second roof rail systems 7, 8 are on the exterior surface of roof 2. Roof rail systems 7, 8 run along the exterior surface of roof parts 3, 4, 5 in the longitudinal direction of vehicle 1. Roof rail systems 7, 8 are located on respective longitudinal sides of roof parts 3, 4, 5 and run parallel to one another. As such, roof rail systems 7, 8 are transversely separated from one another.

First roof rail system 7 includes a first longitudinal support 9 running in the longitudinal direction of vehicle 1. Likewise, second roof rail system 8 includes a second longitudinal support 10 running in the longitudinal direction of vehicle 1. Longitudinal support 9 is fastened through several separated feet 11 to roof parts 3, 4, 5. Likewise, longitudinal support 10 is fastened through several separated feet 12 to roof parts 3, 4, 5. Feet 11, 12 fasten longitudinal supports 9, 10 to roof parts 3, 4, 5 in such a way that longitudinal supports 9, 10 are held at a distance from feet 11, 12. The Figures show only a few support feet which are intended to be examples for clarity. Two cross members 13, 14 extend between longitudinal supports 9, 10. Cross members 13, 14 are of a roof rack 15 in the form of a bicycle rack. FIG. 1 shows cross members 13, 14 holding two bicycles 16.

Figure 2:
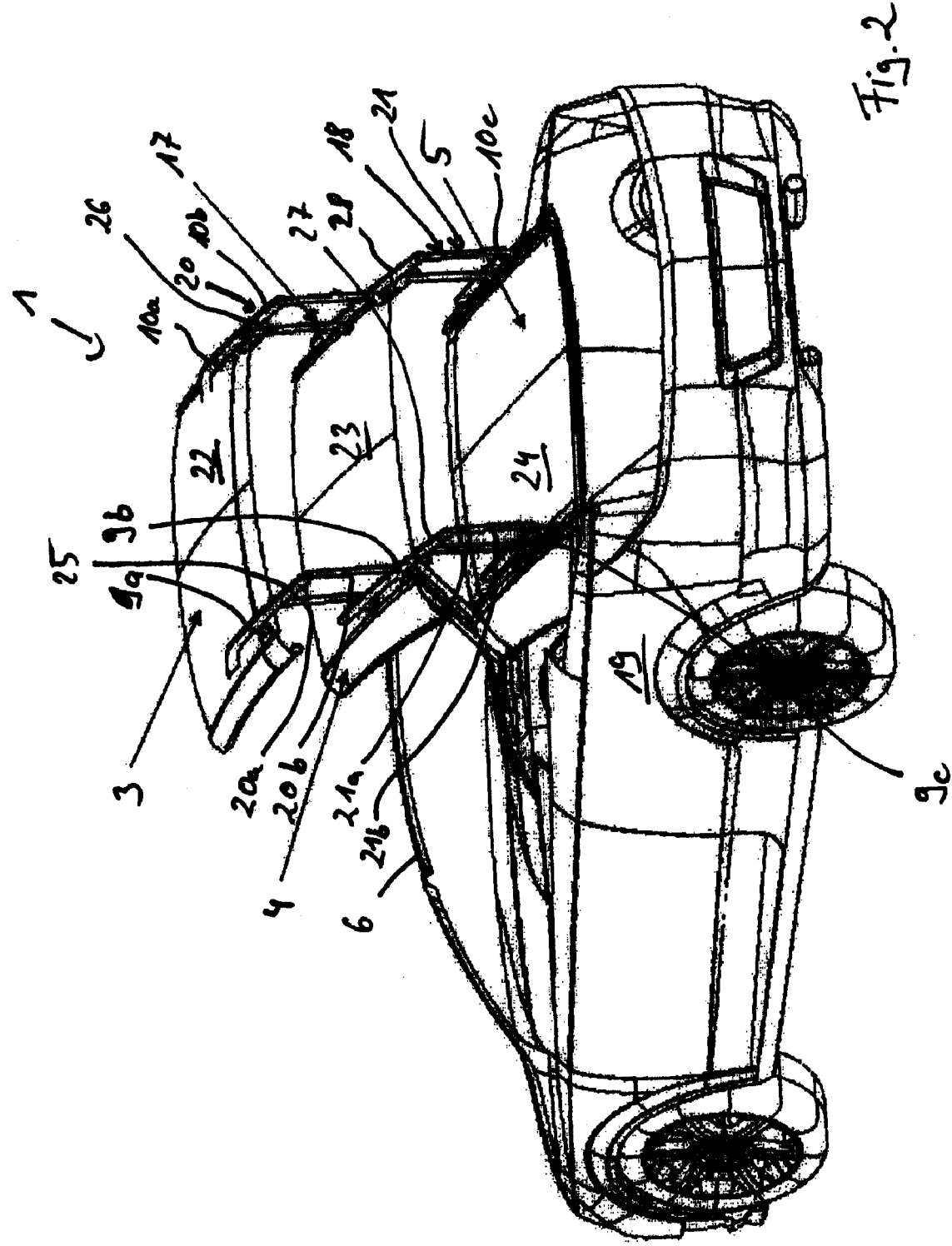
FIG. 2 illustrates the roof in an intermediate position during an adjustment motion from the closed position to the storage position.

With reference to FIG. 2, a first (i.e., front) roof part kinematic system 17 articulately connects front and middle roof parts 3, 4 with one another in an adjustable manner to move roof parts 3, 4 relative to one another and between the closed and storage positions. A second (i.e., rear) roof part kinematic system 18 articulately connects middle and rear roof parts 4, 5 with one another in an adjustable manner to move roof parts 4, 5 relative to one another and between the closed and storage positions. Another roof part kinematic system (not shown) articulately connects rear roof part 5 with vehicle body 19. Each of front and rear roof part kinematic systems 17, 18 include two four-bar kinematic mechanisms 20, 21. Kinematic mechanisms 20 of front roof part kinematic system 17 are transversely separated from one another and located on opposite longitudinally extending sides of roof 2. Likewise, kinematic mechanisms 21 of rear roof part kinematic system 18 are transversely separated from one another and located on opposite longitudinally extending sides of roof 2. Each kinematic mechanism 20 includes a front link 20a and a rear link 20a. Likewise, each kinematic mechanism 21 includes a front link 21a and a rear link 21b.

Longitudinal support 9 of roof rail system 7 is formed of three longitudinal support sections which include a front longitudinal support section 9a, a middle longitudinal support section 9b, and a rear longitudinal support section 9c. Likewise, longitudinal support 10 of roof rail system 8 is formed of three longitudinal support sections which include a front longitudinal support section 10a, a middle longitudinal support section 10b, and a rear longitudinal support section 10c. Front longitudinal support sections 9a, 10a are solidly connected by two support feet with exterior surface 22 of front roof part 3. Middle longitudinal support sections 9b, 10b are solidly connected by two support feet, separated in the longitudinal direction of vehicle 1, with exterior surface 23 of middle roof part 4. Rear longitudinal support sections 9c, 10c are connected by two support feet, separated in the longitudinal direction of vehicle 1, with exterior surface 24 of rear roof part 5. The front support foot of each front longitudinal support section 9a, 10a, and the rear support foot of each rear longitudinal support section 9c, 10c are respectively formed by longitudinal supports 9, 10 themselves. As such, longitudinal supports 9, 10 are bent downward in the end areas. Support feet 11, 12 may be formed as a single piece with longitudinal support sections 9a, 9b, 9c; 10a, 10b, 10c.

Links 20a, 20b of each kinematic mechanism 20 are separated in the longitudinal direction of vehicle 1. The ends of links 20a, 20b which are toward the rear in the closed position pivot on the inside of the support feet of middle longitudinal support sections 9b, 10b, respectively. The opposite ends of links 20a, 20b are articulately connected with front longitudinal support sections 9a, 10a, respectively. The ends of front longitudinal support sections 9a, 10a that are in the rear in the closed position are in the form of pivoting extensions 25, 26, respectively. These pivoting extensions 25, 26 project over front roof part 3 in the closed position in the direction of middle roof part 4. In the closed position, longitudinal support sections 9a, 9b, 9c and 10a, 10b, 10c, respectively, line up in the longitudinal direction of vehicle 1.

In the closed position, the longer legs of L-shaped links 20a, 20b are oriented parallel to longitudinal support sections 9a, 9b; 10a, 10b. The shorter legs of L-shaped links 20a, 20b are concealed by the support feet. In this way, links 20a, 20b are hidden from sight by longitudinal support sections 9a, 9b and 10a, 10b and by the associated support feet of middle longitudinal support sections 9b, 10b.

Analogously, kinematic mechanisms 21 with their links 21a, 21b are arranged between middle roof part 4 and rear roof part 5 on respective sides of roof 2. The ends of links 21a, 21b that are toward the rear in the closed position pivot on support feet of rear longitudinal support sections of roof rail systems 7, 8. The opposite ends of links 21a, 21b pivot on pivoting extensions 27, 28 of middle longitudinal support sections 9b, 10b. In the closed position, the longer legs of L-shaped links 21*b* and U-shaped links 21*a* are arranged parallel to one another and parallel to rear longitudinal support sections 9*c*, 10*c*.

Figure 3:
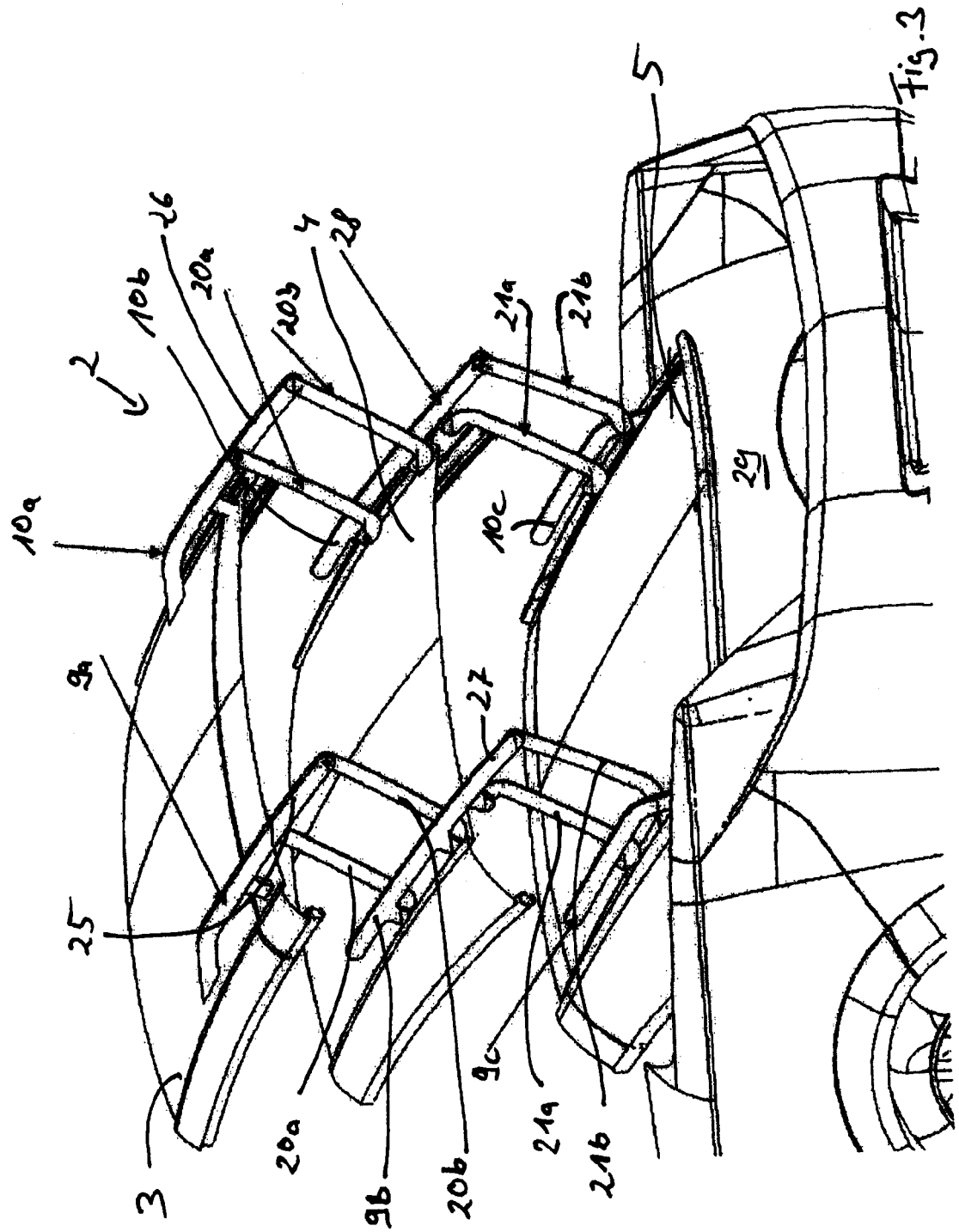
FIG. 3 illustrates an enlarged view of the roof as shown in FIG. 2.

FIG. 3 illustrates an enlargement of roof 2 as shown in FIG. 2. FIG. 3 shows longitudinal support sections 9*a*, 9*b*, 9*c* and 10*a*, 10*b*, 10*c*, which form the two separated longitudinal supports 9, 10 of roof rail systems 7, 8. Each longitudinal support section 9*a*, 9*b*, 9*c* and 10*a*, 10*b*, 10*c* is held on associated roof parts 3, 4, 5 with two support feet. The adjustment kinematic system of rear roof part 5 is not shown. Here it is also possible, for example, to have recourse to a four-bar kinematic system inside of storage compartment 29.

FIG. 3 shows the essentially L-shaped form of links 20*a*, 20*b*, 21*a*, and 21*b* clearly. The short legs of these links pivot on support feet of longitudinal support sections 9*b*, 9*c* and 10*b*, 10*c*. The longer legs of links 20*a*, 20*b*, and 21*b* pivot on associated pivoting extensions 25, 26, 27, 28. Links 21*a* of rear roof part kinematic systems 21 have a particular feature. These links 21*a* are U-shaped with two separated short legs and one long connection leg. In the closed position, the long leg is oriented parallel to longitudinal support sections 9*b*, 9*c* and 10*b*, 10*c*. The two short legs of links 21*a* of rear roof part kinematic systems 21 pivot on downward projections of longitudinal support sections 9*b*, 9*c* and 10*b*, 10*c*.

Figure 4:
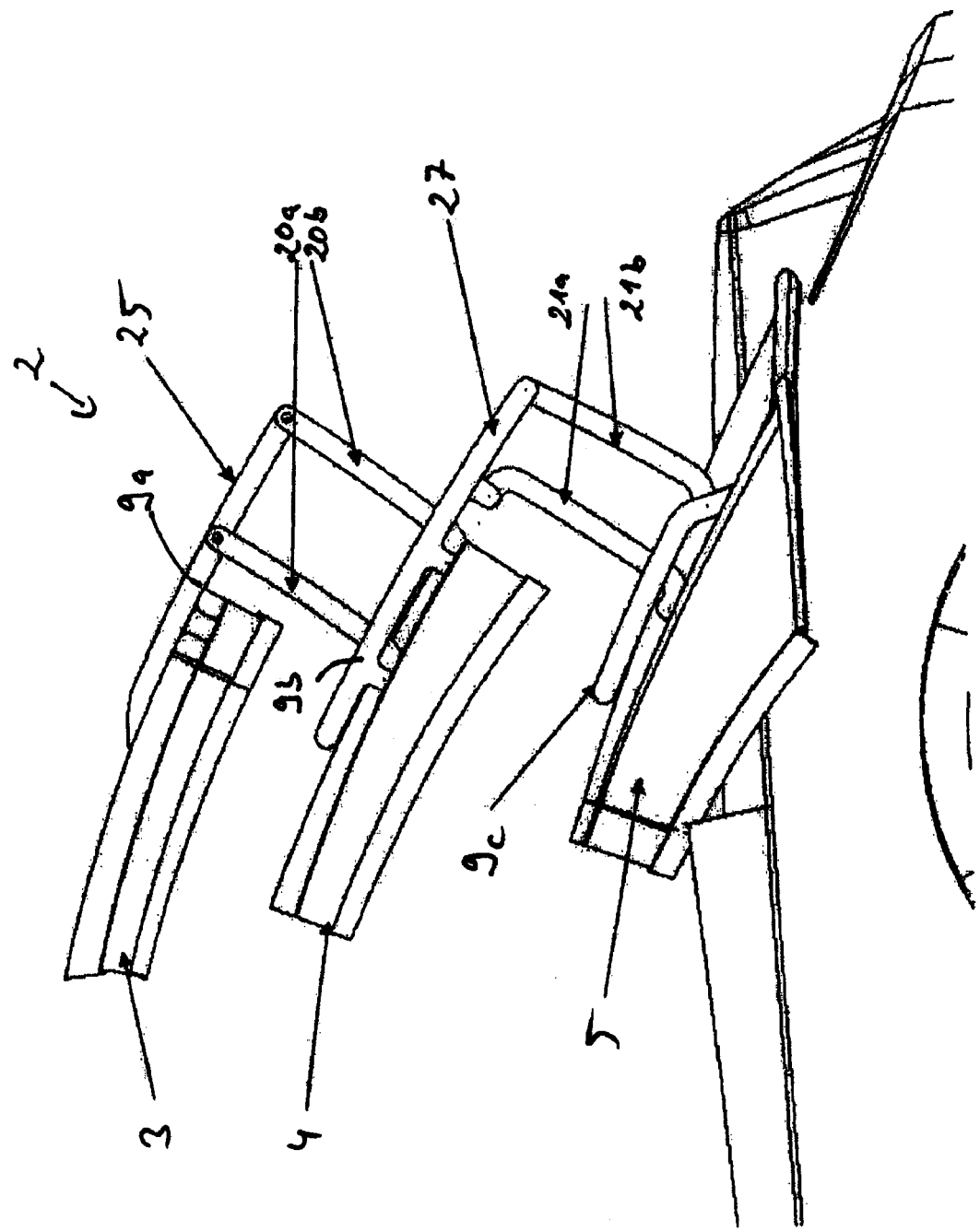
FIG. 4 illustrates a side view of the roof as shown in FIG. 3.

FIG. 4 illustrates a side view of roof 2 as shown in FIG. 3. In this intermediate position, links 20*a*, 20*b*, 21*a*, 21*b* are approximately at a right angle to longitudinal support sections 9*a*, 9*b*, 9*c*.

Figure 5:
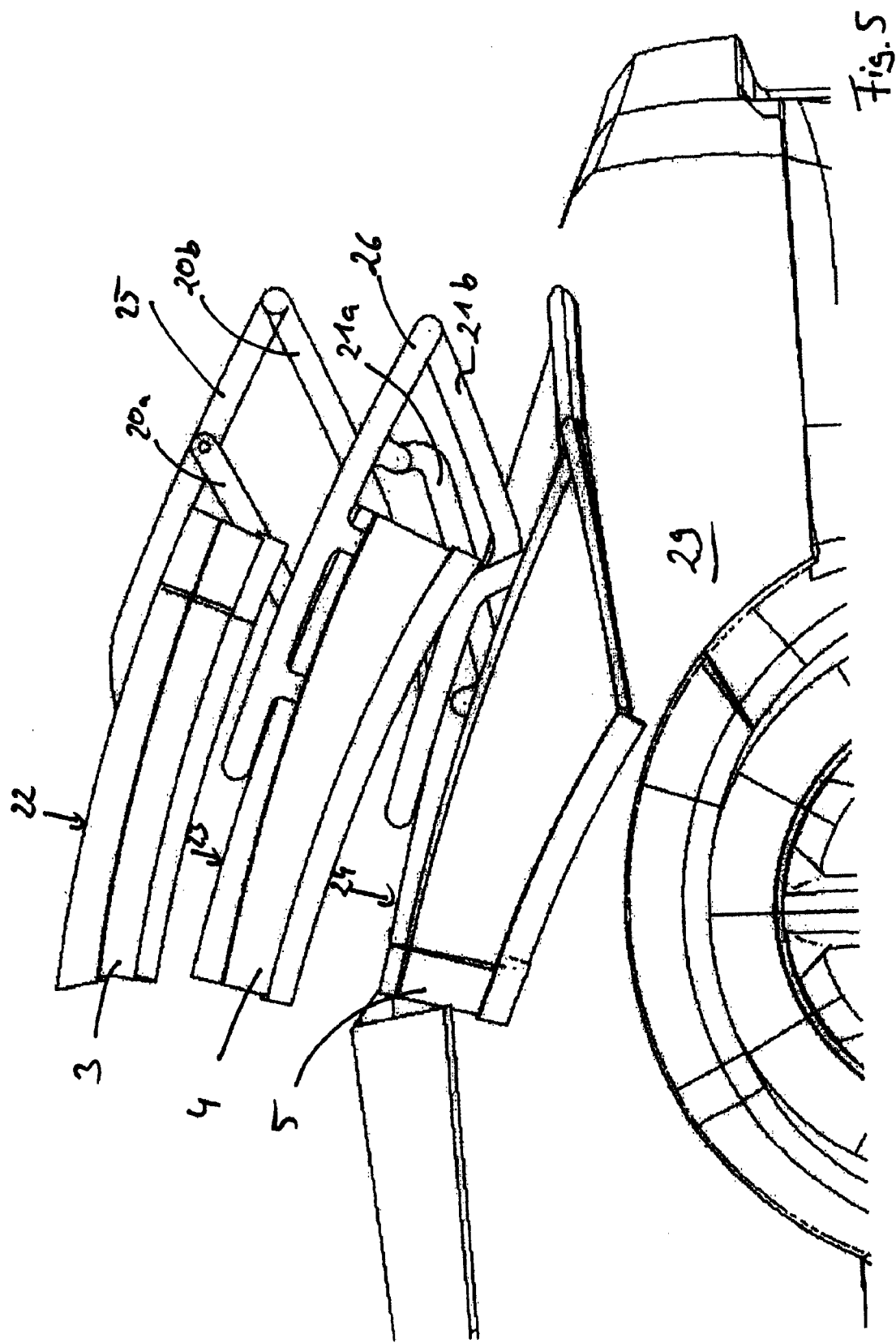
FIG. 5 illustrates the roof in another intermediate position in which the roof parts form a stack of roof parts.
Figure 6:
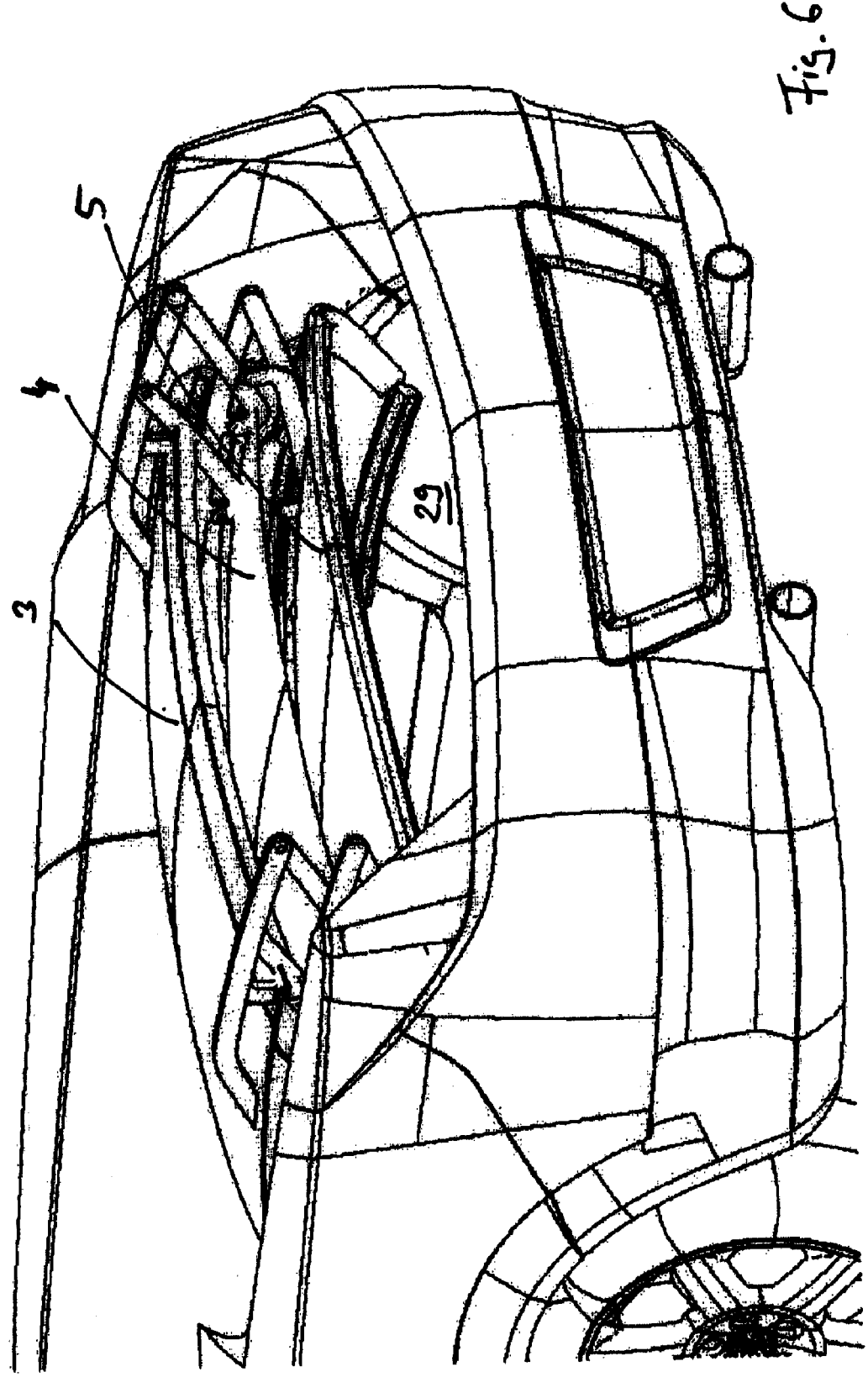
FIG. 6 illustrates the roof in the storage position.

In FIG. 5, roof parts 3, 4 have already pivoted, in a combined translational/rotary movement, far enough backward to form a stack of roof parts. Within the stack of roof parts, roof parts 3, 4, 5 are arranged in same direction, with their roof exterior aimed upward. Rear roof part 5 has already been adjusted a little downward toward the back, in the direction of storage compartment 29, by the associated kinematic system.

In FIG. 6, the stack of roof parts of roof parts 3, 4, 5 has been stored in a stack of roof parts within storage compartment 29. Roof parts 3, 4, 5 are arranged on top of one another and parallel to one another. Storage compartment 29 can be closed by a convertible top compartment cover.

Figure 7:
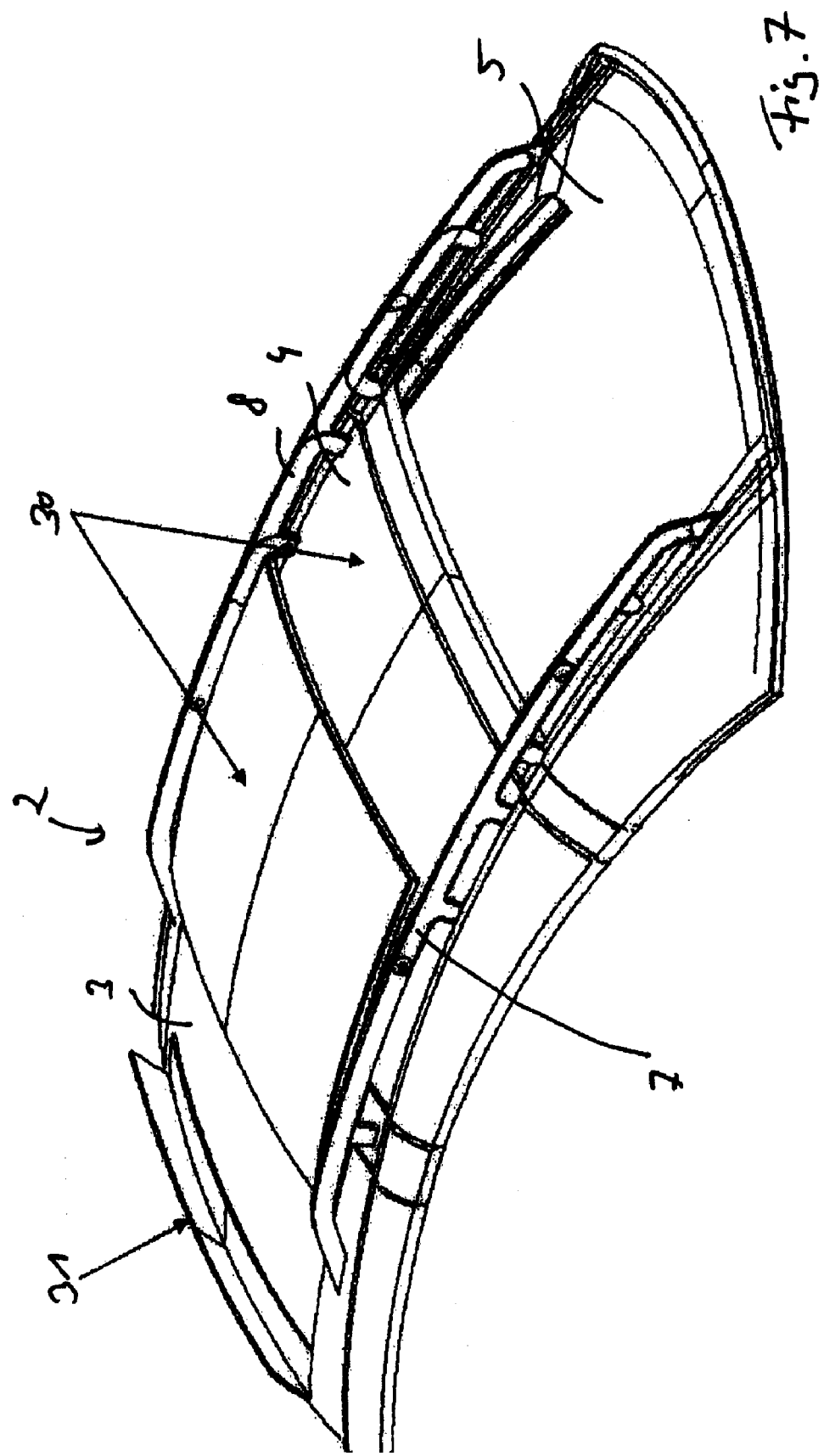
FIG. 7 illustrates the roof in the closed position with two sunroofs that can move in the longitudinal direction, and with a hinged wind deflector running in the transverse direction of the vehicle.

FIG. 7 shows an alternative variant design of roof 2. The roof part kinematic systems for adjustment of front and middle roof parts 3, 4 are a component of two parallel roof rail systems 7, 8 arranged in the side areas of roof 2. Front and middle roof parts 3, 4 have sunroof parts 30 built into them. Sunroofs 30 are movable in the longitudinal direction of vehicle 1 from one roof part to another. For example, sunroofs 30 can be pushed onto rear roof part 5, each exposing an opening in front roof part 3 and in middle roof part 4. Front roof part 3 has a hinged wind deflector 31 on it. Roof 2 made in such a way can be used in coupe position, in convertible position, and with open sunroof parts 30.

Figure 8:
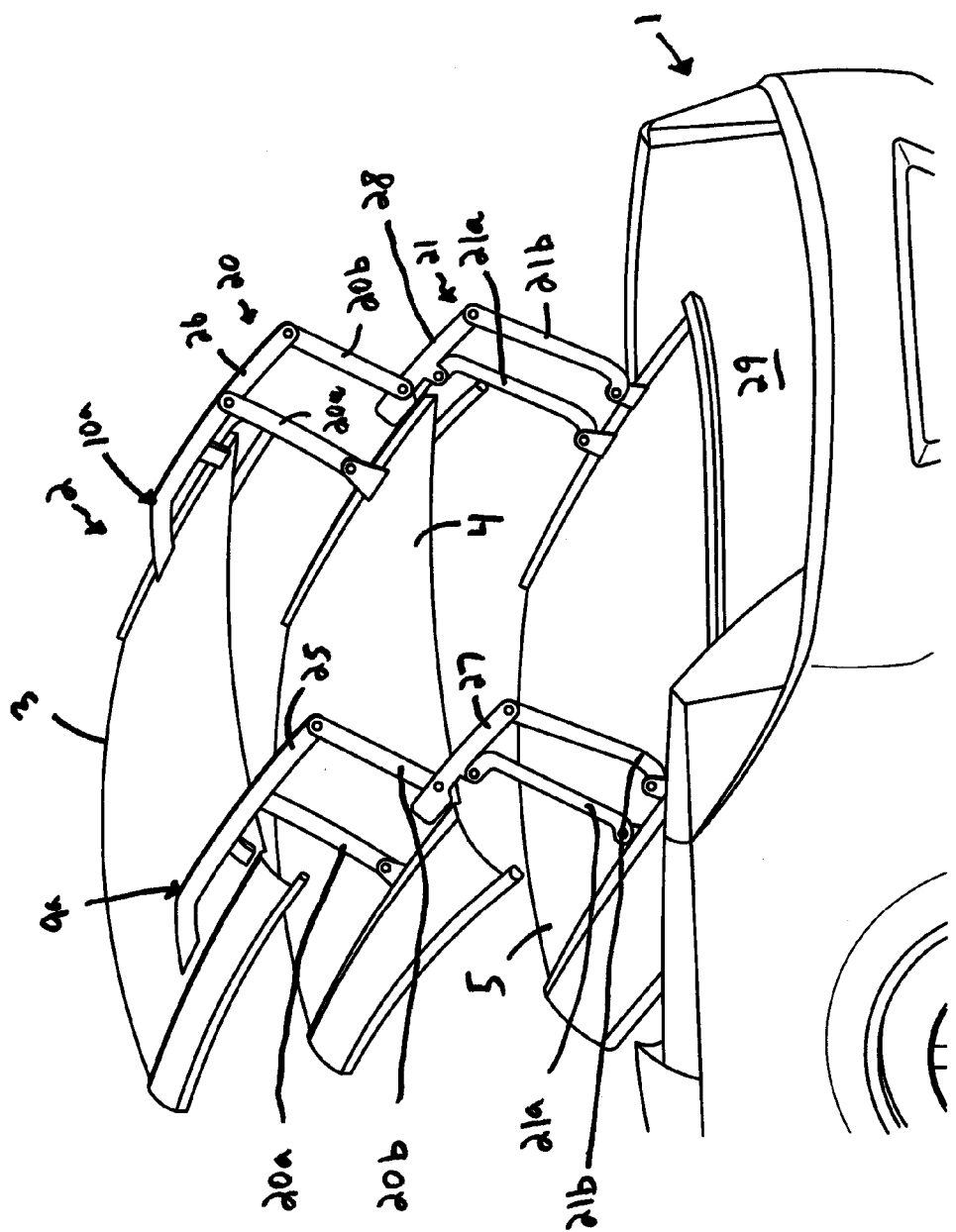
FIG. 8 illustrates the roof in accordance with another embodiment of the present invention with the roof being in an intermediate position during an adjustment motion from the closed position to the storage position.
Figure 9:
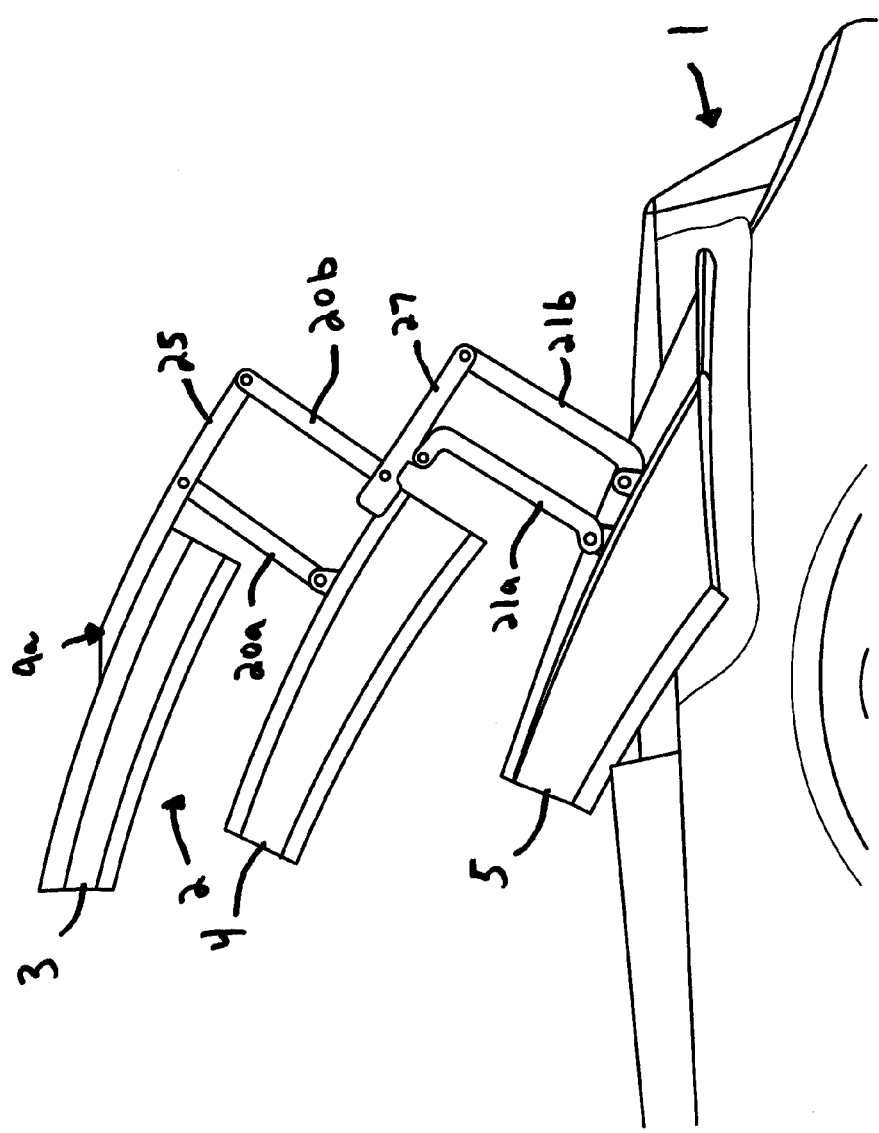
FIG. 9 illustrates a side view of the roof shown in FIG. 8.

FIG. 8 shows roof 2 in accordance with another embodiment of the present invention with roof 2 being in an intermediate position during an adjustment motion from the closed position to the storage position. FIG. 9 illustrates a side view of roof 2 shown in FIG. 8. As shown in FIGS. 8 and 9, roof rail systems 7, 8 are formed exclusively by the kinematic systems in a manner as described above.

List of Reference Numbers
1 Vehicle
2 Hardtop vehicle roof
3 Front roof part
4 Middle roof part
5 Rear roof part
6 Windshield frame
7 Roof rail system
8 Roof rail system
9 Longitudinal support
9*a* Front longitudinal support section
9*b* Middle longitudinal support section
9*c* Rear longitudinal support section
10 Longitudinal support
10*a* Front longitudinal support section
10*b* Middle longitudinal support section
10*c* Rear longitudinal support section
11 Support feet
12 Support feet
13 Cross member
14 Cross member
15 Roof rack
16 Bicycles
17 Roof part kinematic system
18 Roof part kinematic system
19 Body
20 Four-bar kinematic mechanism
20*a* Front link
20*b* Rear link
21 Four-bar kinematic mechanism
21*a* Front link
21*b* Rear link
22 Exterior surface of the front roof part
23 Exterior surface of the middle roof part
24 Exterior surface of the rear roof part
25 Pivoting extension
26 Pivoting extension
27 Pivoting extension
28 Pivoting extension
29 Storage compartment
30 Sunroof parts
31 Wind deflector While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A hardtop vehicle roof comprising:

at least two roof parts movable between a closed position in which the roof parts are arranged flush behind one another in a longitudinal direction to thereby cover a vehicle interior and a storage position in which the roof parts are arranged in a stack to thereby expose the vehicle interior, wherein each roof part has an exterior surf ace facing away from the vehicle interior in the closed position, wherein each roof part has first and second longitudinally extending sides transversely separated from one another; and a first pair of roof part kinematic mechanisms transversely separated from one another, one of the roof part kinematic mechanisms articulately connecting the first sides of two of the roof parts together and the other of the roof part kinematic mechanisms articulately connecting the second sides of the two roof parts together to move the two roof parts between the closed and storage positions, wherein in the closed position the two roof parts are arranged flush behind one another in the longitudinal direction with a first one of the two roof parts arranged in front of a second one of the two roof parts, wherein the roof part kinematic mechanisms are respectively arranged on the exterior surface of the second roof part on the sides of the second roof part, wherein in the closed position the roof part mechanisms respectively form at least a part of a pair of roof rail systems running longitudinally along the exterior surfaces of the roof parts.

2. The roof of claim 1 wherein:
each roof rail system includes a longitudinal support running longitudinally, wherein each longitudinal support includes a first support section and a second support section.

3. The roof of claim 2 wherein:
each roof rail system includes a first support foot and a second support foot;
wherein the first support foot of each roof rail system holds the first support section of the longitudinal support of the roof rail system on the first one of the two roof parts at a distance from the first one of the two roof parts and the second support foot of each roof rail system holds the second support section of the longitudinal support of the roof rail system on the second one of the two roof parts at a distance from the second one of the two roof parts.

4. The roof of claim 3 wherein:
each roof part kinematic mechanism includes a link arrangement having a front link and a rear link, wherein the links of each roof part kinematic mechanism are arranged to pivot at one end relative to the exterior surface of the second one of the two roof parts.

5. The roof of claim 4 wherein:
the links of each roof part kinematic mechanism pivot at the one end on the second support foot.

6. The roof of claim 4 wherein:
the links of each roof part kinematic mechanism pivot at the one end on the second support section of the longitudinal support.

7. The roof of claim 4 wherein:
the links of each roof part kinematic mechanism pivot at the other end on a pivoting extension extending from the first one of the two roof parts over the second one of the two roof parts.

8. The roof of claim 7 wherein:
each pivoting extension is a section of the first support section of each longitudinal support.

9. The roof of claim 4 wherein:
at least one section of each link of each roof part kinematic mechanism is arranged parallel to the longitudinal support of each rail system in the closed position.

10. The roof of claim 4 wherein:
the links of each roof part kinematic mechanism forms, at least in a section, the longitudinal support of each rail system.

11. The roof of claim 4 wherein:
each link of each roof part kinematic mechanism forms, at least in a section, a respective one of the support sections of the longitudinal support of each rail system.

12. The roof of claim 4 wherein:
the links of each roof part kinematic mechanism pivot on the inside, facing a longitudinal central axis, of a respective one of the support sections of the longitudinal support of each rail system.

13. The roof of claim 4 wherein:
the links of each roof part kinematic mechanism pivot on the inside, facing a longitudinal central axis, of a respective one of the support feet of each rail system.

14. The roof of claim 1 wherein:
the at least two roof parts are adjustable relative to one another by the roof part kinematic mechanisms such that in the storage position the at least two roof parts lie on top of one another.

15. The roof of claim 4 wherein:
the at least two roof parts include three roof parts, wherein the first one of the two roof parts is a front roof part, the second one of the two roof parts is a middle roof part, and a third roof part is a rear roof part such that in the closed position the front roof part is arranged in front of the middle roof part and the middle roof part is arranged in front of the rear roof part.

16. The roof of claim 15 further comprising:
a second pair of roof part kinematic mechanisms, wherein the first pair of roof part kinematic mechanisms is between the front and middle roof parts to articulately connect the front and middle roof parts together and the second pair of roof part kinematic mechanisms is between the middle and rear roof parts to articulately connect the middle and rear roof parts together;
wherein each of the second pair of roof part kinematic mechanisms includes a second link arrangement having a second front link and a second rear link, wherein the links of each roof part kinematic mechanism of the first pair of roof part kinematic mechanisms are arranged to pivot at one end relative to the exterior surface of the middle roof part, wherein the links of each roof part kinematic mechanism of the second pair of roof part kinematic mechanisms are arranged to pivot at one end relative to the exterior surface of the rear roof part.

17. The roof of claim 16 wherein:
each longitudinal support of each rail system further includes a third support section and a third support foot, wherein the third support foot of each roof rail system holds the third support section of the longitudinal support of the roof rail system on the third roof part at a distance from the third roof part;
wherein the links of each roof part kinematic mechanism of the first pair of roof part kinematic mechanisms pivot at the one end on the second support foot of the second support section of each longitudinal support on the middle roof part and at the other end on a pivoting extension of the front roof part;
the links of each roof part kinematic mechanism of the second pair of roof part kinematic mechanisms pivot at the one end on the third support foot of the third support section of each longitudinal support on the rear roof part and at the other end on a pivoting extension of the middle roof part.

18. The roof of claim 17 wherein:
in the storage position, the roof parts are laid on top of one another in same direction with the exterior surfaces of the roof parts pointing upward.

19. The roof of claim 1 wherein:
at least one of the at least two roof parts includes an integrated sunroof.

20. The roof of claim 1 wherein:
each of the first and second roof parts includes an integrated sunroof.

* * * * *

UNITED STATES PATENT AND TRADEMARK OFFICE
CERTIFICATE OF CORRECTION

PATENT NO. : 7,500,710 B2  Page 1 of 1
APPLICATION NO. : 11/553286
DATED : March 10, 2009
INVENTOR(S) : Wojciech Wezyk et al.

It is certified that error appears in the above-identified patent and that said Letters Patent is hereby corrected as shown below:

Column 8, Line 51, Claim 1:
Delete "sur face" and insert -- surface --.

Signed and Sealed this

Fifth Day of May, 2009

JOHN DOLL
*Acting Director of the United States Patent and Trademark Office*